United States Patent
Johnson

(10) Patent No.: US 8,631,528 B1
(45) Date of Patent: Jan. 21, 2014

(54) SELF ADJUSTING LATCH FOR A RAMP

(71) Applicant: David Johnson, Modesto, CA (US)

(72) Inventor: David Johnson, Modesto, CA (US)

(73) Assignee: Lift-U, division of Hogan Mfg., Inc., Escalon, CA (US)

( * ) Notice: Subject to any disclaimer, the term of this patent is extended or adjusted under 35 U.S.C. 154(b) by 0 days.

(21) Appl. No.: 13/766,660

(22) Filed: Feb. 13, 2013

(51) Int. Cl.
*E01D 1/00* (2006.01)

(52) U.S. Cl.
USPC ............................................. 14/71.1; 14/69.5

(58) Field of Classification Search
USPC .................. 14/69.5, 71.1, 71.3; 414/537, 921
See application file for complete search history.

(56) References Cited

U.S. PATENT DOCUMENTS

| | | | |
|---|---|---|---|
| 5,158,419 A | 10/1992 | Kempf | |
| 5,382,130 A | 1/1995 | Kempf | |
| 5,553,343 A * | 9/1996 | Alexander | 14/71.1 |
| 5,832,554 A * | 11/1998 | Alexander | 14/71.1 |
| 6,769,149 B2 * | 8/2004 | Alexander | 14/71.3 |
| 6,802,095 B1 * | 10/2004 | Whitmarsh et al. | 14/71.3 |
| 6,988,289 B2 * | 1/2006 | Pedersen et al. | 14/69.5 |
| 8,032,963 B2 | 10/2011 | Morris | |
| 8,234,737 B2 * | 8/2012 | Morris et al. | 14/71.3 |
| 2008/0271266 A1 | 11/2008 | Johnson | |
| 2013/0174359 A1 * | 7/2013 | Morris et al. | 14/71.1 |

OTHER PUBLICATIONS

Middendorf, J., "CAMS-A Technical Review" (Article circa 1985), <http://www.bigwalls.net/climb/camf/> [retrieved Jul. 26, 2013, 6 pages.

* cited by examiner

*Primary Examiner* — Gary Hartmann
(74) *Attorney, Agent, or Firm* — Christensen O'Connor Johnson Kindness PLLC

(57) ABSTRACT

A latch assembly is used with a ramp assembly that includes a ramp portion selectively movable between a stowed position and a deployed position. The latch assembly has a latch fitting and a catch, both of which are rotatably mounted to the ramp assembly. The catch engages the latch fitting to selectively lock the latch fitting in a first locked position and a second locked position. A pin is coupled to the latch fitting so that rotation of the latch fitting moves the pin in an arcuate path. The pin engages the ramp portion when the latch fitting is in the first locked position and also when in the second locked position.

11 Claims, 11 Drawing Sheets

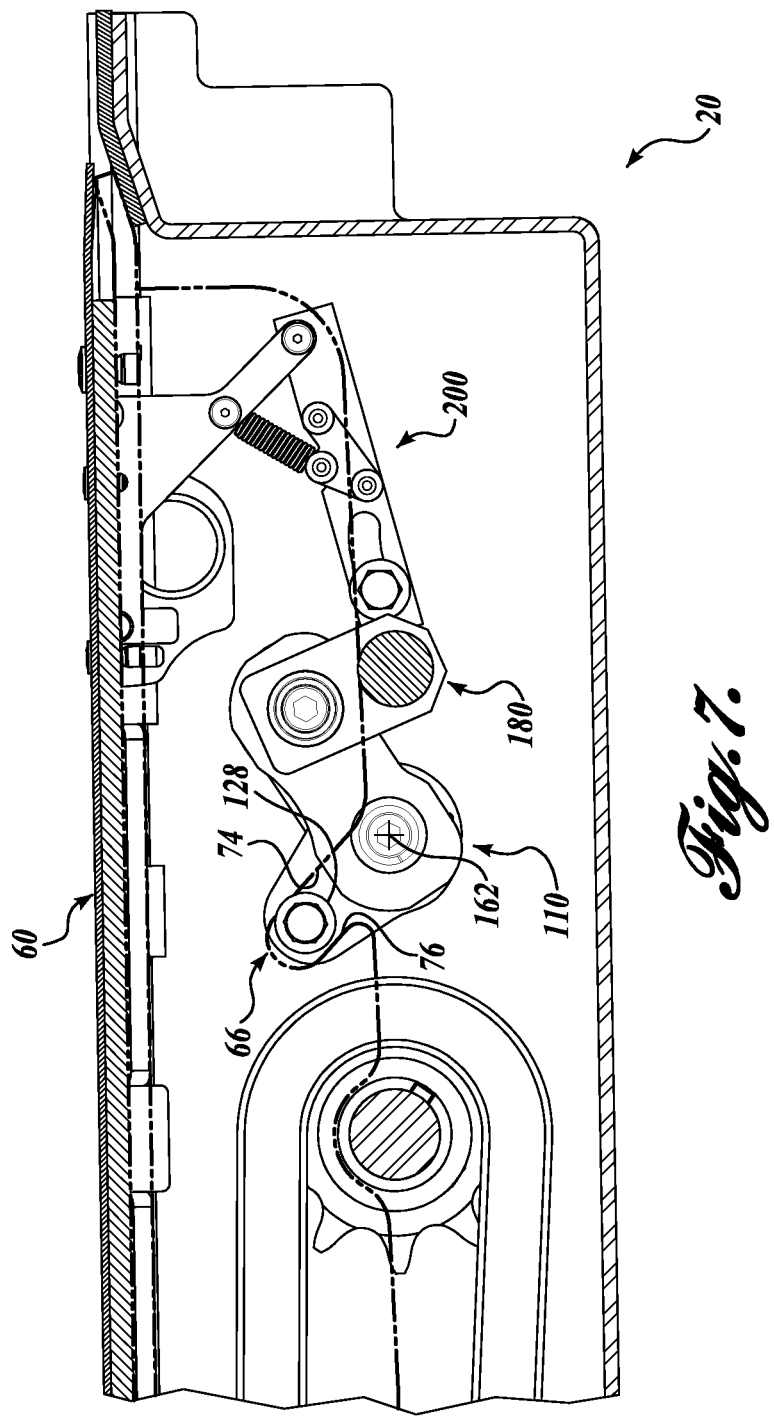

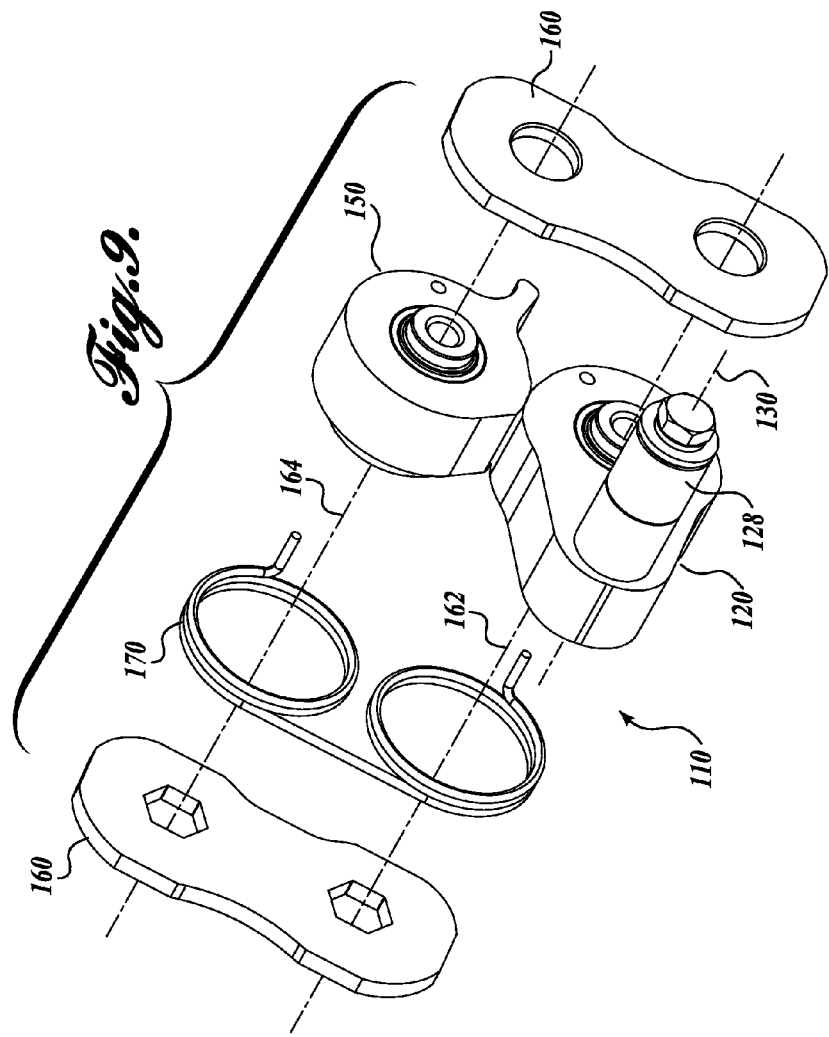
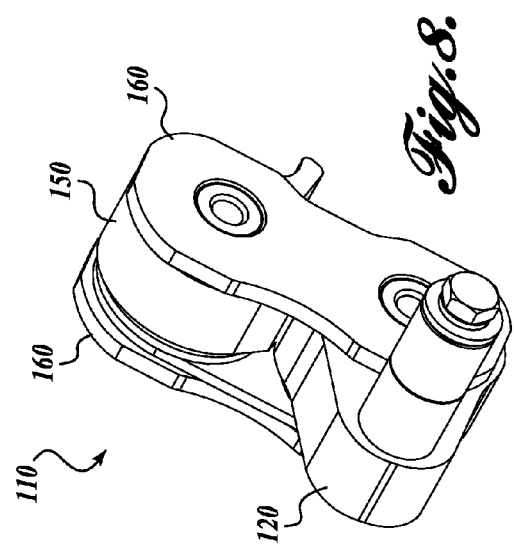

SELF ADJUSTING LATCH FOR A RAMP

TECHNICAL FIELD

The present disclosure relates generally to latches for fold out ramps.

BACKGROUND

The Americans with Disabilities Act (ADA) requires the removal of physical obstacles to those who are physically challenged. The stated objective of this legislation has increased public awareness and concern over the requirements of the physically challenged. Consequentially, there has been more emphasis in providing systems that assist such a person to access a motor vehicle, such as a bus or minivan.

A common manner of providing the physically challenged with access to motor vehicles is a ramp. Various ramp operating systems for motor vehicles are known in the art. Some slide out from underneath the floor of the vehicle and tilt down. Others are stowed in a vertical position and are pivoted about a hinge, while still others are supported by booms and cable assemblies. The present disclosure is generally directed to a "fold out" type of ramp. Such a ramp is normally stowed in a horizontal position within a recess in the vehicle floor, and is pivoted upward and outward to a downward-sloping extended position. In the extended position, the ramp is adjustable to varying curb heights.

During normal vehicle operation, a stowed ramp can vibrate if not restrained by a latch. In addition to creating unnecessary noise, such vibration can cause damage to the ramp requiring premature maintenance and even shortening the life of the ramp.

Variation in manufacturing and installation of ramps can result in variation of the ramp position when the ramp is stowed. In order to ensure proper engagement with the ramp, currently known latches sometimes require adjustment during installation to account for the ramp position variation.

SUMMARY

In accordance with aspects of the present disclosure, a latch assembly is provided for use with a ramp assembly. The ramp assembly includes a ramp portion selectively movable between a stowed position and a deployed position. The latch assembly has a latch fitting and a catch, both of which are rotatably mounted to the ramp assembly. The catch engages the latch fitting to selectively lock the latch fitting in a first locked position and in a second locked position. A pin is coupled to the latch fitting so that rotation of the latch fitting moves the pin in an arcuate path. The pin engages the ramp portion when the latch fitting is in the first locked position and also when in the second locked position.

In accordance with another aspect of the present disclosure, a latch assembly is provided for use with a ramp assembly. The ramp assembly includes a ramp portion selectively movable between a stowed position and a deployed position. The latch assembly has a latch fitting rotatably mounted to the ramp assembly. The latch fitting has a first cam surface and engages the ramp portion when the latch fitting is in both a first locked position and a second locked position. The latch assembly further includes a catch rotatably mounted to the ramp assembly. The catch has a second cam surface selectively engaging the first cam surface to lock the latch fitting in a first locked position and a second locked position.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 7 is a partial side view of the latch assembly of FIG. 3 with the ramp portion in the stowed position;

FIG. 8 is an isometric view of a locking mechanism of the latch assembly of FIG. 3;

FIG. 9 is an exploded isometric view of the locking mechanism of FIG. 8;

DETAILED DESCRIPTION

Figure 1:
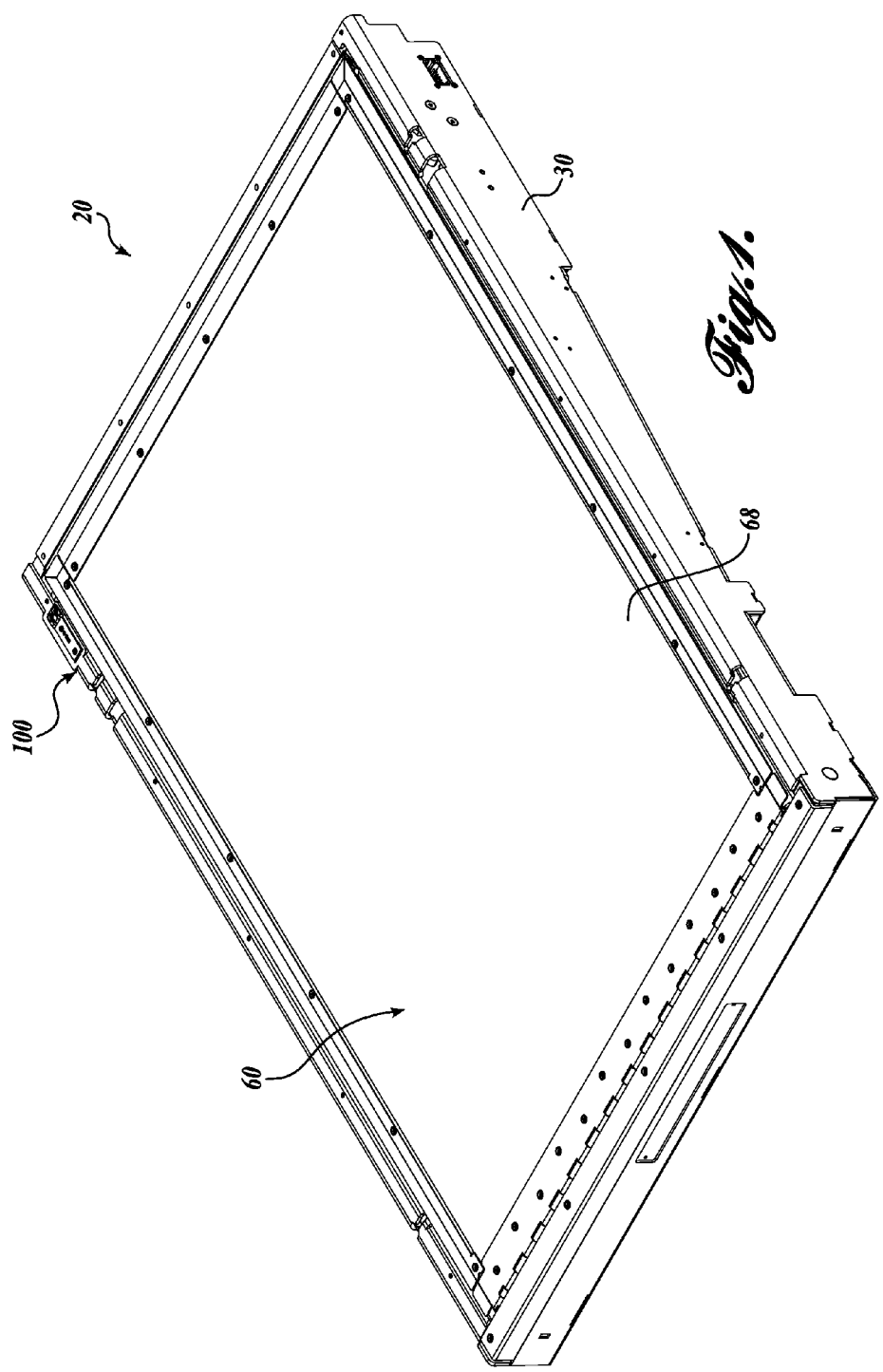
FIG. 1 is an isometric view of an exemplary embodiment of a ramp assembly with a ramp portion in the stowed position.
Figure 2:
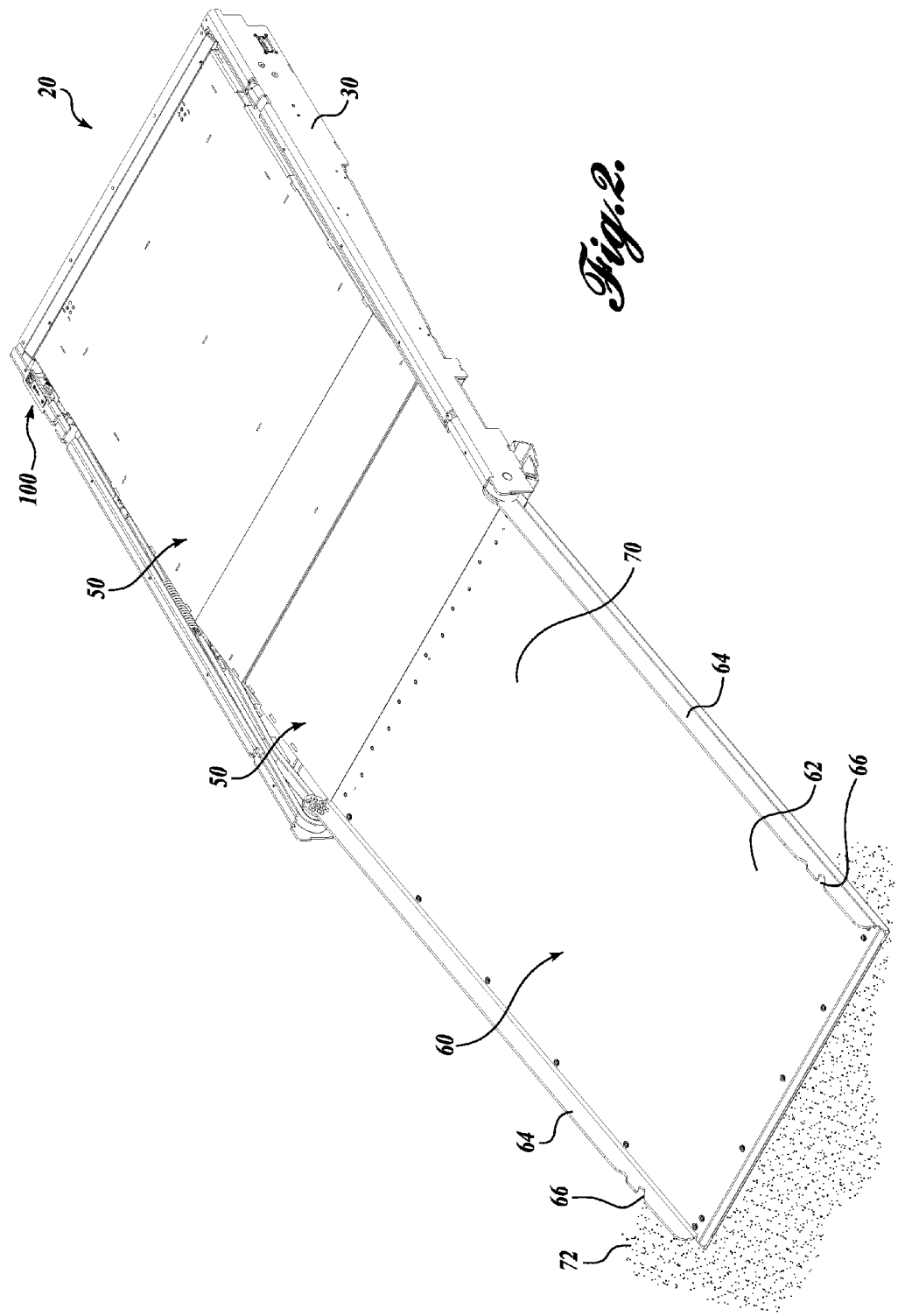
FIG. 2 is an isometric view of the ramp assembly shown in FIG. 1 with the ramp portion in a deployed position.
Figure 3:
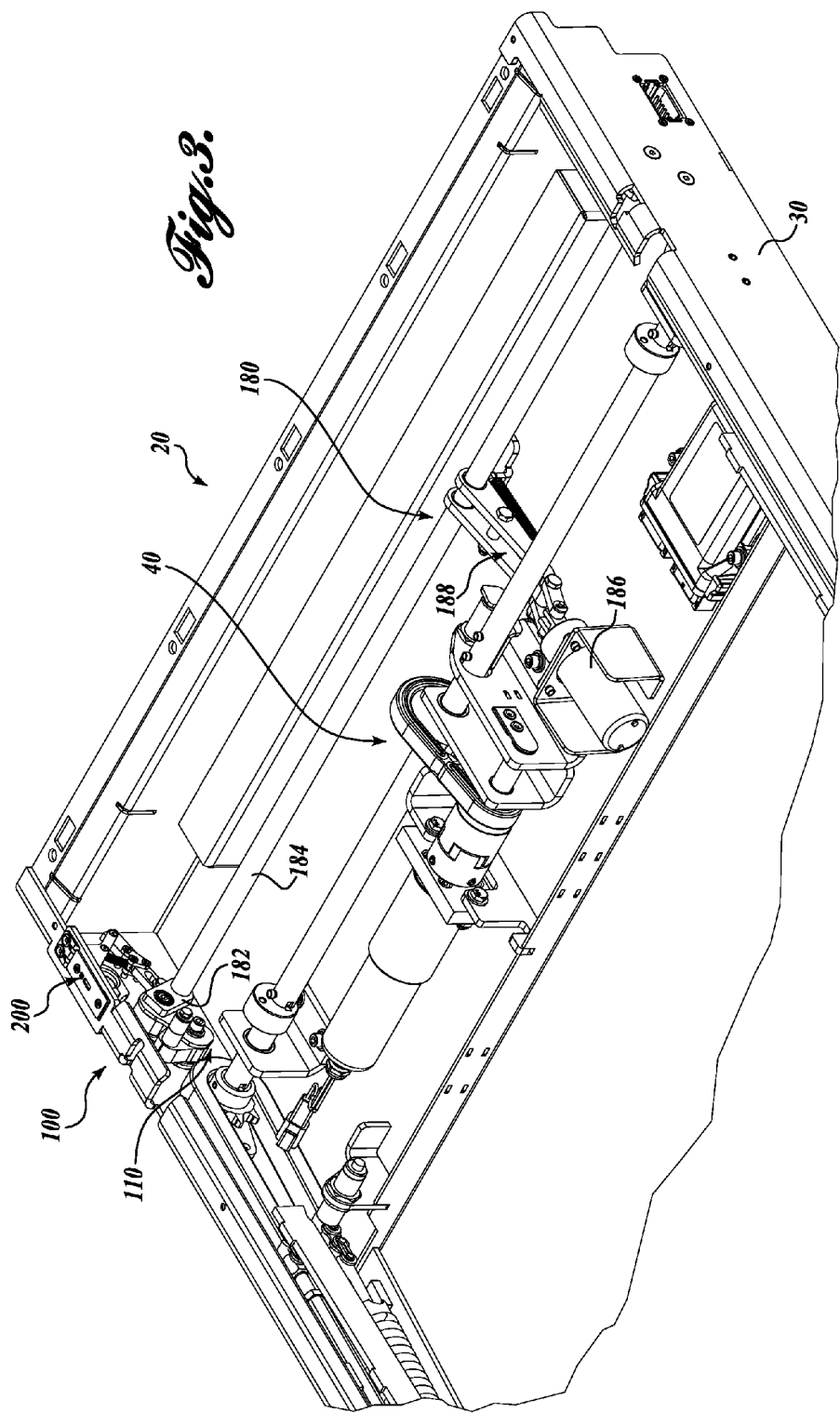
FIG. 3 is a partial isometric view of a latch assembly of the ramp assembly of FIG. 1, with the ramp portion in the deployed position.

The present disclosure is directed to a latch suitable for securing a ramp in a stowed position. Referring to FIGS. 1-3, a fold out ramp assembly 20 (hereinafter "ramp assembly 20") suitable for use with a disclosed latch is shown. The ramp assembly 20 includes a frame 30, a drive assembly 40, one or more inner panels 50, and a ramp portion 60. The frame 30 of the ramp assembly 20 is adapted to be mounted to a vehicle (not shown) having a floor, such as a bus or a van. The ramp assembly 20 is reciprocal between the stowed position, as shown in FIG. 1, and a deployed position, as shown in FIG. 2.

Although the illustrated embodiments of the ramp assembly 20 include a frame 30, other embodiments are contemplated in which the ramp assembly 20 does not include a frame 30. When such embodiments are installed in vehicles, the ramp assembly 20 components are attached directly to the structure of the vehicle or to a suitable structure within the vehicle, thus making a frame 30 unnecessary. Similarly, when such embodiments are installed in stationary installations, such as residential buildings and the like, the ramp assembly 20 components are attached to the structure of the building or any other suitable structure within the building. Accordingly, embodiments of the described ramp assembly 20 that do not include a frame should be considered within the scope of the present disclosure.

As best shown in FIG. 2, the ramp portion 60 includes a panel 62, which is constructed from well-known materials, and side curbs 64. The side curbs 64 extend upwardly from the forward and rear sides of the panel 62. A slot 66 is formed in each side curb 64. As will be described in further detail, each slot 66 is sized and configured to engage a latch assembly 100 to secure the ramp portion 60 in the stowed position. In addition, each side curb 64 enhances the structural strength of the ramp portion 60 and provides edge guards for the sides of the ramp portion 60, thereby increasing the safety of the ramp assembly 20.

The ramp portion 60 is selectively rotatable about a first end. As shown in FIG. 1, when the ramp assembly 20 is in the stowed position, the ramp portion 60 extends inwardly from the first end and is disposed over the one or more inner panels 50. When the ramp portion 60 is so disposed, a first surface 68 of the ramp portion 60 faces upward to provide a surface upon which able-bodied passengers can walk.

Referring back to FIG. 2, when the ramp assembly 20 is in the deployed position, the ramp portion 60 extends outwardly from the first end. In the deployed position, the second surface 70 of the ramp portion 60 and the one or more inner panels 50 cooperate to provide a transition surface from the vehicle interior to an alighting surface 72.

It will be appreciated that the described ramp assembly 20 is exemplary only and should not be considered limiting. In this regard, the latch assembly described hereinafter is suitable for use with a variety of ramp assembly configurations, and the use of the described latch assembly with different ramp assemblies is contemplated and should be considered within the scope of the present disclosure.

Figure 4:
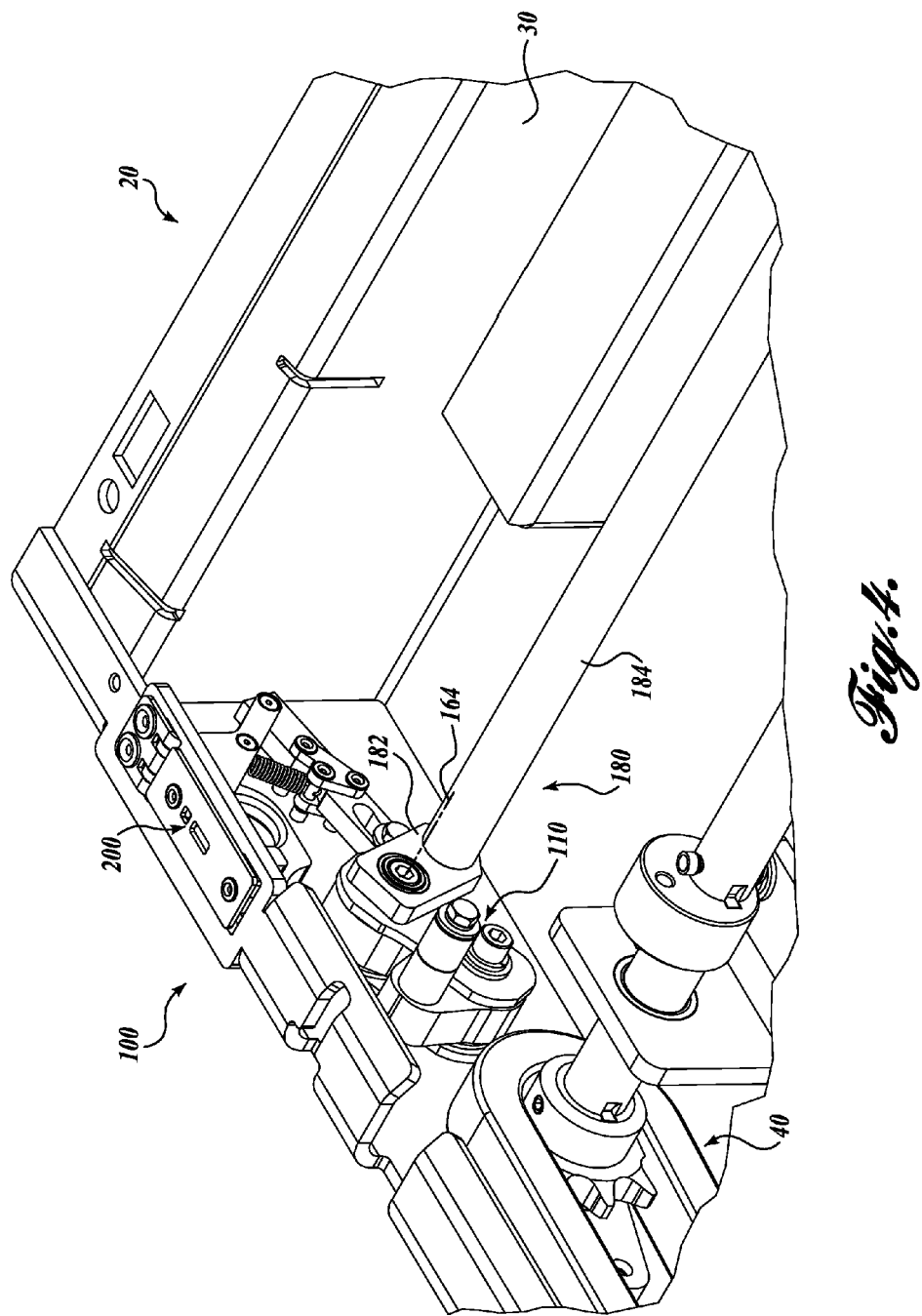
FIG. 4 is a partial isometric view of the latch assembly of FIG. 3.

Referring to FIGS. 3 and 4, the latch assembly 100 includes a locking mechanism 110, a powered release assembly 180, and a manual release assembly 200. It should be appreciated that alternate embodiments are possible wherein the latch assembly 100 only includes one of the powered release assembly 180 or manual release assembly 200, i.e., the latch assembly is powered-release only or manual-release only.

Figure 5:
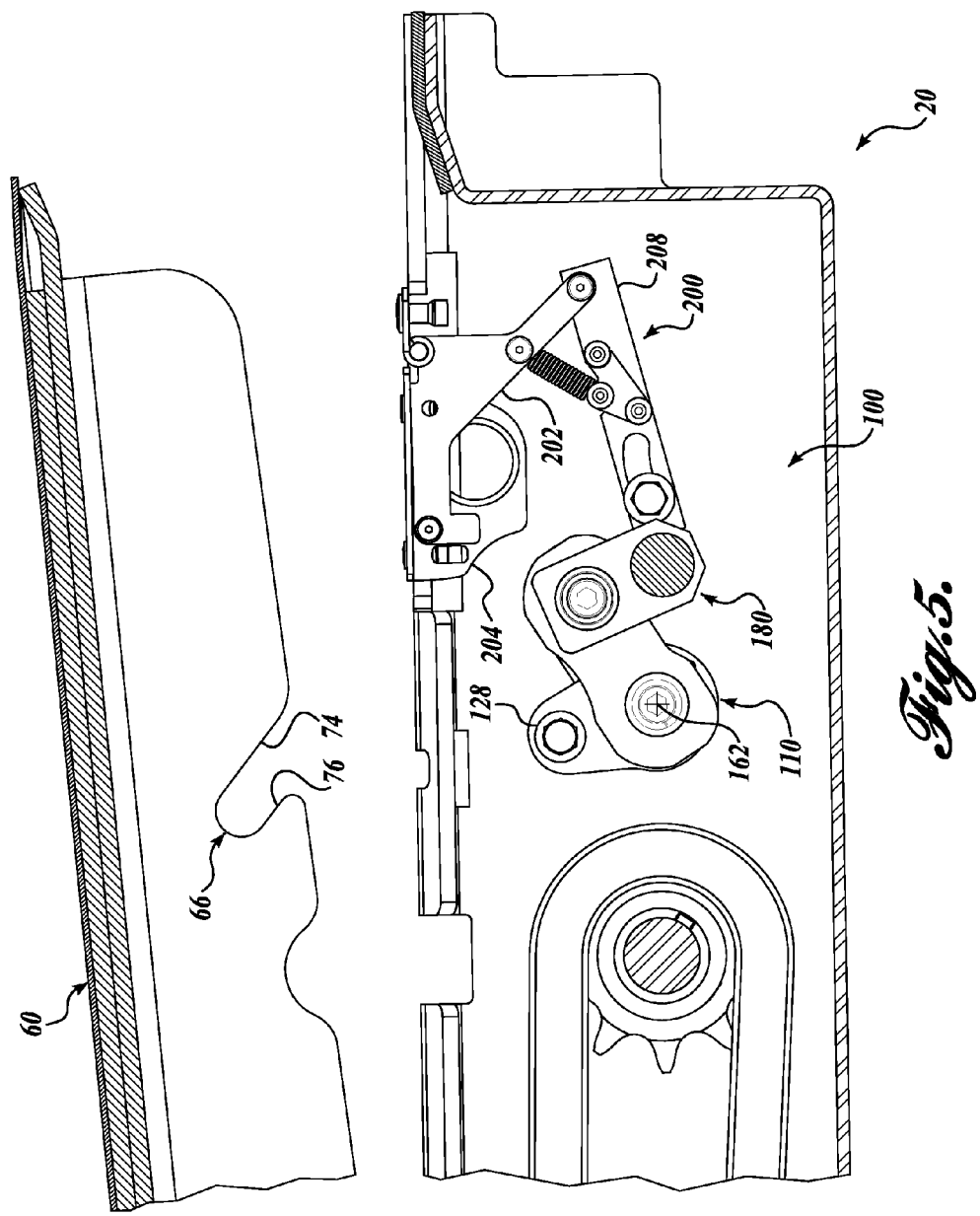
FIG. 5 is a partial side view of the latch assembly of FIG. 3 with the ramp portion between the stowed position and the deployed position.
Figure 6:
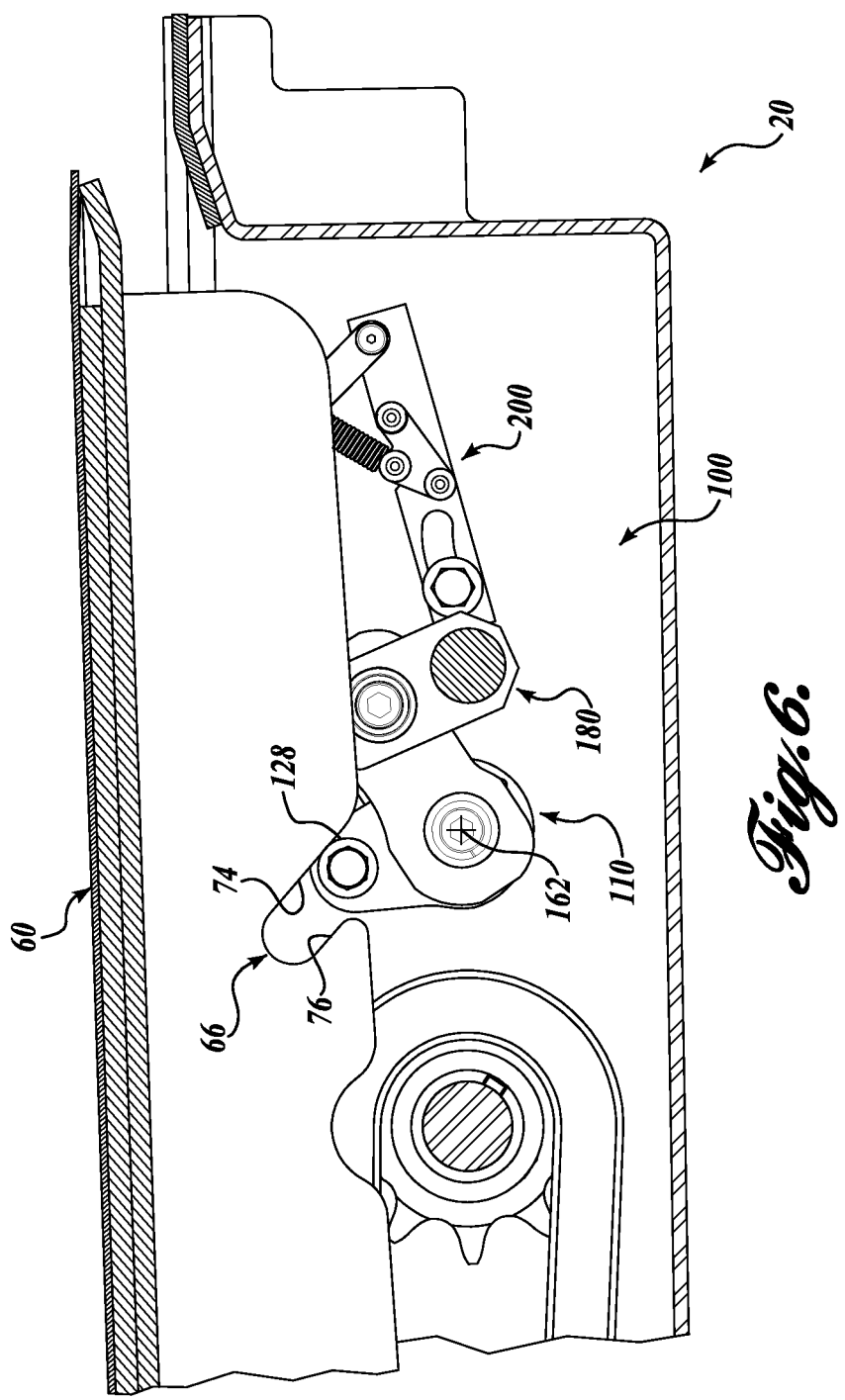
FIG. 6 is a partial side view of the latch assembly of FIG. 3 with the ramp portion between the stowed position and the position shown in FIG. 5.

Engagement of the latch assembly 100 will now be described with reference to FIGS. 5-7. In FIG. 5, the ramp portion 60 is shown partially deployed as it approaches the stowed position. When the ramp portion 60 is so positioned, the slot 66 formed in the ramp portion is disposed above a pin 128 that forms part of the locking mechanism 110. Other embodiments are contemplated wherein a roller is utilized in place of the illustrated pin 128. It should be appreciated that any structure suitable for engaging the slot 66 as described below can be utilized and should be considered within the scope of the present disclosure.

As the ramp portion 60 moves toward the stowed position, the pin 128 contacts an upper engagement surface 74 defined by a portion of the slot 66. As the ramp portion 60 continues to move to the stowed position, the upper engagement surface 74 of the slot 66 drives the pin 128 along an arcuate path about an axis 162. As shown in FIGS. 6 and 7, the continued motion of the ramp portion 60 and the pin 128 moves the pin into the slot 66 so that the pin is at least partially disposed within the slot when the ramp portion is in the stowed position.

With ramp portion 60 in the stowed position, the pin 128 is at least partially disposed within the slot 66 between the upper and lower engagement surfaces 74 and 76. When the locking mechanism 110 is in a locked position, the pin 128 is fixedly located so that engagement of the pin with the upper and lower engagement surfaces 74 and 76 limits movement of the ramp portion 60. Accordingly, the latch assembly 100 retains the ramp portion 60 in the stowed position.

To deploy the ramp portion 60, the locking mechanism 110 is released, which allows the pin 128 to move about axis 162. In the disclosed embodiment, the locking mechanism 110 is configured such that the pin 128 is biased to move in a clockwise direction (as viewed in FIGS. 5-7) when the locking mechanism is released from a locked position. Accordingly, the pin 128 engages and moves along the upper engagement surface 74 of the slot 66 until the ramp portion 60 has moved far enough that the pin disengages from the slot.

Figure 10:
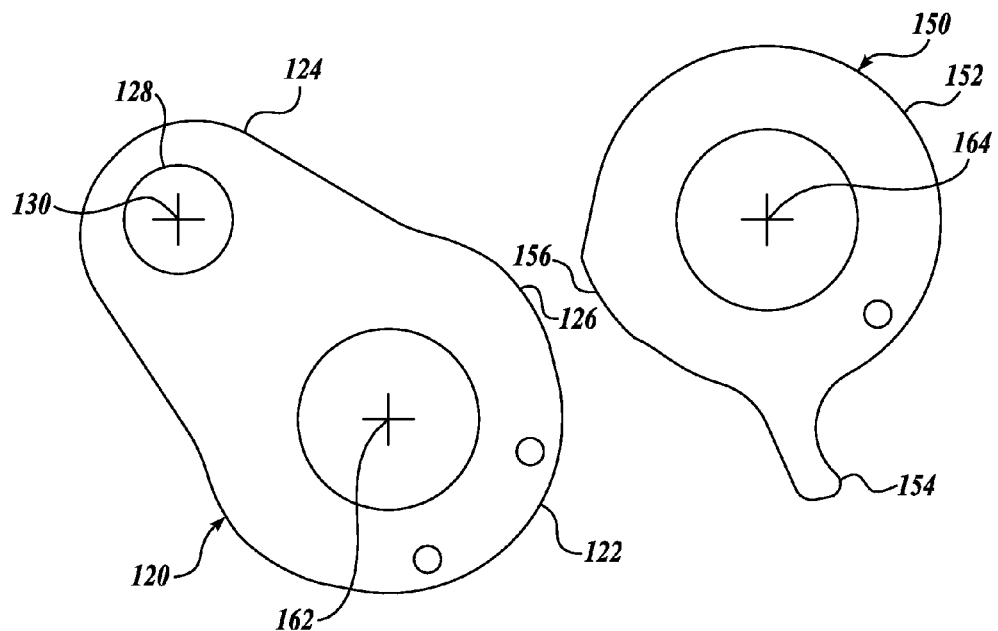
FIG. 10 is a partial, exploded side view of the locking mechanism of FIG. 8.

FIGS. 8-10 shows an exemplary embodiment of a locking mechanism 110 for the latch assembly 100 in accordance with the present disclosure. The locking mechanism 110 includes a latch fitting 120 and a catch 150 disposed between two generally parallel end plates 160. The latch fitting 120 is rotatably coupled to the end plates 160 about a first axis 162, and the catch 150 is rotatably coupled to the end plates 160 about a second axis 164, which is parallel to the first axis 162. Both the latch fitting 120 and catch 150 are preferably made from known metallic materials; however any materials having suitable properties may be used.

As best shown in FIG. 10, the latch fitting 120 includes a body 122 with a lobe 124 extending radially therefrom. A cam surface 126 is formed on the body 122 of the latch fitting 120. Referring to FIGS. 8 and 9, attached to a distal end of the lobe 124 is a pin 128 that extends from the lobe so that the central axis 130 of the pin is parallel to the first axis 162. Accordingly, rotation of the latch fitting 120 about the first axis 162 moves the pin 128 along an arcuate path. The pin 128 is sized and configured to engage the slot 66 in the ramp portion 60 as previously described to selectively retain the ramp portion in the stowed position.

Still referring to FIG. 10, the catch 150 includes a body 152 and tab 154 extending radially therefrom. The catch 150 further includes a cam surface 156 located on the body 150. The cam surface 156 is positioned to selectively engage the cam surface 126 of the latch fitting 120.

A biasing element 170 engages the latch fitting 120 and the catch 150 to bias the latch fitting and catch in opposing directions about their respective axes 162 and 164. As shown in FIG. 9, the illustrated biasing element includes a pair of helical torsion springs formed from a single length of wire. Each of the helical torsion springs is associated with one of the latch fitting 120 and the catch 150. More specifically, in the illustrated embodiment, the one of the helical torsion springs biases the latch fitting 120 in a clockwise direction about axis 162 (as viewed in FIG. 10), while the other helical torsion spring biases the catch 150 in a counterclockwise direction about axis 164 (as viewed in FIG. 10).

It will be appreciated that the form and configuration of the biasing element 170 is not limited to the disclosed embodiment. In this regard, the biasing element 170 can take the form of separate helical torsion springs, each spring biasing one of the latch fitting 120 and the catch 150. The biasing element 170 is also not limited to helical torsion springs, but instead can utilize spiral torsion springs, compression springs, extension springs, or any other springs configured to bias the latch fitting 120 and the catch 150 in opposing directions.

Figure 11:
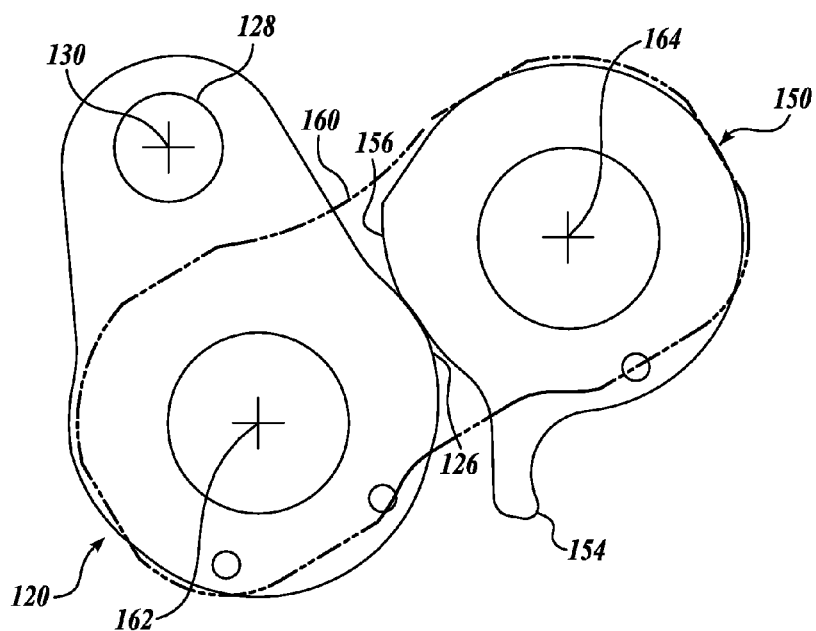
FIG. 11 is a partial side view of the locking mechanism of FIG. 8, with the locking mechanism in an unlocked position.

FIG. 11 shows a partial view of the locking mechanism 110 in an unlocked position. When the locking mechanism 110 is in the unlocked position, the ramp portion 60 has been deployed and has not yet returned to the stowed position. In the unlocked position, the biasing member 170 biases the latch fitting 120 so that the pin 128 is in a raised position, as shown in FIG. 11. As previously described, the pin 128 is positioned to be received within the slot 66 in the ramp portion 60 when the ramp portion moves to the stowed position. While the locking mechanism 110 is in the unlocked position, the biasing member 170 also biases the catch 150 in the counterclockwise direction (as viewed in FIG. 11) so that the catch 150 and the latch fitting 120 are in contact.

Figure 12:
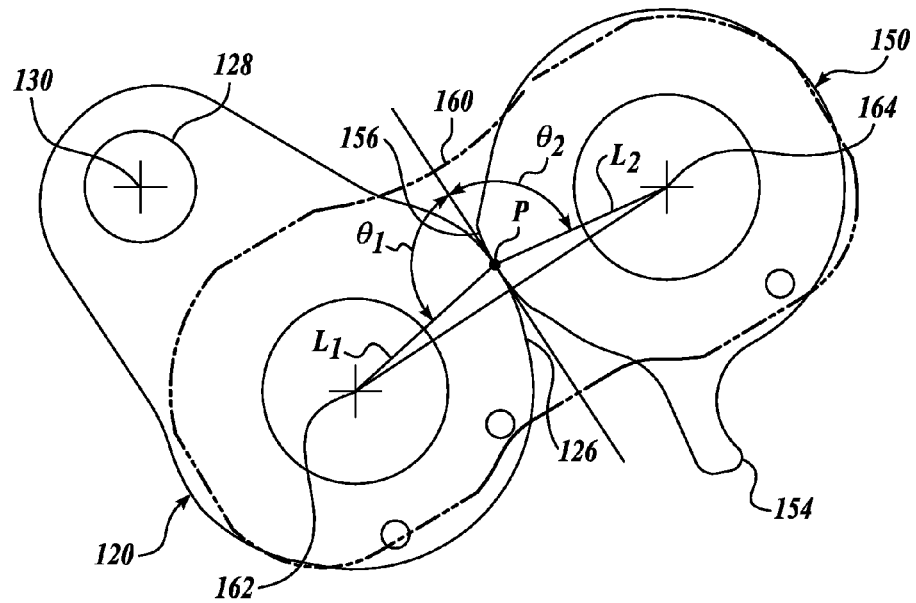
FIG. 12 is a partial side view of the locking mechanism of FIG. 8, with the locking mechanism in a locked position.

Movement of the ramp portion 60 to the stowed position moves the locking mechanism 110 from the unlocked position of FIG. 11 to the locked position of FIG. 12. As the ramp portion 60 approaches the stowed position, the slot 66 in the ramp portion 60 engages the pin 128 to rotate the latch fitting 120 in a counterclockwise direction (as viewed in FIG. 12) against the biasing force provided by the biasing member 170. While the latch fitting 120 rotates in the counterclockwise direction, the force applied to the catch 150 by the biasing member 170 biases the catch in the counterclockwise direction so that the catch 150 maintains sliding contact with the latch fitting 120.

As the latch fitting 120 continues to rotate away from the unlocked position, the cam surface 126 of the latch fitting 120 maintains contact with the cam surface 156 of the catch 150. Referring to FIG. 12, the cam surfaces 126 and 156 are sized and configured such that for a given range of latch fitting 120 positions, each point on the cam surface 126 of the latch fitting 120 corresponds to a point on the cam surface 156 of the catch 150. Moreover, the shapes of the cam surfaces 126 and 156 are such that contact between corresponding points always occurs at point P, shown in FIG. 12, which maintains a fixed location. For any given latch fitting position 120 within the predefined range, a point on the latch fitting cam surface 126 will contact the corresponding point on catch cam surface 156 at point P. Consequently, position of the latch fitting 120 determines the position of the catch 150.

Still referring to FIG. 12, when the position of the latch fitting 120 is within the given range of positions, the contact point P between the latch fitting and the catch 150 is offset from the line that connects the first and second axes 162 and 164. This configuration produces a camming action between the latch fitting 120 and the catch 150 that allows the latch fitting to move in the counterclockwise direction, while preventing the latch fitting from moving in the clockwise direction.

To ensure that the latch fitting 120 does not slide relative to the catch 150 when a force biases the latch fitting in the clockwise direction, the latch fitting and the catch are configured so that the coefficient of friction between the two is sufficient to prevent slipping. The coefficient of friction can be controlled through the selection of materials of the latch fitting 120 and catch 150. Optionally, coatings can be applied to one or both of the cam surfaces 126 and 156 to provide durable surfaces that maintain a suitable coefficient of friction.

The cam surfaces 126 and 156 are configured to provide a consistent camming action through a range of latch fitting 120 positions. To accomplish this, the cam surfaces 126 and 156 have profiles that maintain a constant line of force for the latch fitting 120 and catch 150. Because the contact point P maintains a fixed position relative to the axis 162 of the latch fitting 120 and the axis 164 of the catch 150, the line $L_1$ between the axis 162 of the latch fitting 120 and the contact point P maintains a generally constant angle $\theta_1$ relative to the surface of the catch 150 at the contact point P. Similarly, the line $L_2$ between the axis 164 of the catch 150 and the contact point P maintains a generally constant angle $\theta_2$ relative to the surface of the latch fitting 120 at the contact point P.

Because the latch fitting 120 and the catch 150 maintain generally constant angles through the range of latch fitting 120 positions, the locking mechanism 110 exhibits similar locking characteristics throughout the range of latch fitting positions. As a result, the locking mechanism 110 is capable of restraining the ramp portion 60 in a variety of ramp positions. This, in turn, allows the latch assembly 100 to account for variations in the position of the ramp portion 60. In addition, the self adjusting characteristics of the locking mechanism allows for a single locking mechanism to be used on different styles of ramp assemblies because the locking mechanism can account for variation in the stowed position of the ramp portion 60 of different models of ramp assemblies.

Figure 13:
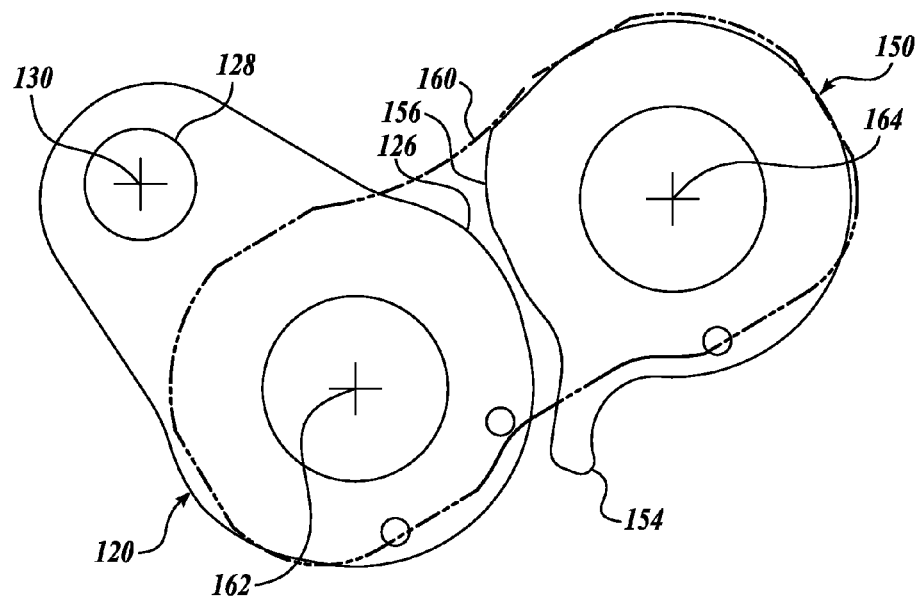
FIG. 13 is a partial side view of the locking mechanism of FIG. 8, with the locking mechanism in released position.

Referring now to FIG. 13, to release the locking mechanism 110 from a locked position, such as the one shown in FIG. 12, the catch 150 is rotated in a clockwise direction to disengage the cam surface 156 of the catch 150 from the cam surface 126 of the latch fitting 120. With the catch 150 disengaged from the latch fitting 120, the biasing element 170 rotates the latch fitting 120 back to the unlocked position shown in FIG. 11. During the initial portion of the ramp deployment, movement of the latch fitting 120 toward the unlocked position is limited by the edges of the slot 66; however, when the ramp portion 60 has deployed beyond the initial stages, the pin 128 disengages from the slot 66 to the unlocked position of FIG. 11. With the latch fitting 120 in the unlatched position, the catch 150 is released so that the biasing element 170 rotates the catch back to the position shown in FIG. 11. With the locking mechanism 110 in the unlocked position of FIG. 11, the locking mechanism is positioned to lockingly engage the ramp portion 60 when the ramp portion 60 returns to the stowed position.

As shown in FIGS. 3-7, the illustrated embodiment of a latch assembly 100 includes a powered release assembly 180 to release the locking mechanism 110 from the locked position. As best shown in FIGS. 3 and 4, the powered release assembly 180 includes a pair of links 182 rotatably associated with the frame 30. In the illustrated embodiment, the links 182 are coupled to the locking mechanism 110 at opposing sides of the ramp assembly 20 and are rotatable about axis 164. It should be appreciated that the location and axis of rotation for the illustrated links is exemplary only. In this regard, the location and motion of the links 182 can vary, and should be considered within the scope of the present disclosure.

Referring now to FIG. 3, a bar 184 is connected at each end to one of the links 182 so that the bar spans the frame 30. An actuator 186 is connected to a central portion of the bar 184 by a linkage 188. When the latch assembly 100 is in a locked position, the bar 184 is positioned proximate to or contacting the tab 154 that extends radially from the catch 150. To release the locking mechanism 110, the actuator 186 applies a force to the bar 184 to drive the bar along an arcuate path about axis 164. The actuator 186 moves the bar 184 so that a portion of the bar contacts the tab 154 of the catch 150, thereby rotating the catch 150 from the locked position shown in FIG. 12 to the released position shown in FIG. 13. With the latch fitting 120 returned to the unlocked position of FIG. 11, the actuator 186 returns to its normal position, allowing the catch 150 to return to the unlocked position.

The illustrated embodiment of a powered release assembly 180 is exemplary only and should not be considered limiting. Alternate embodiments are contemplated wherein the actuator is not a linear actuator, as shown, but is instead a rotary actuator. Further the powered release assembly 180 is not limited to the disclosed combination of links and a bar, but can include any configuration suitable for temporarily rotating the catch 150 to move the locking mechanism 110 from a locked position to an unlocked position. Such alternate configurations are contemplated and should be considered within the scope of the present disclosure.

Figure 14:
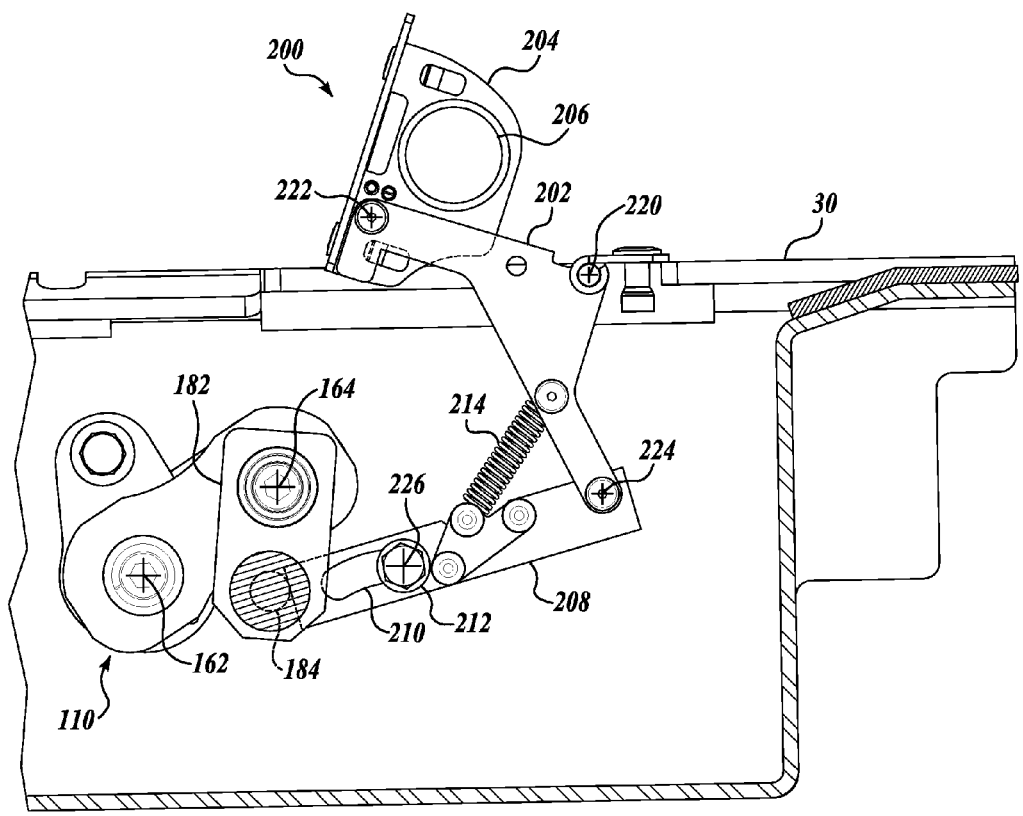
FIG. 14 is a partial side view of the latch assembly of FIG. 7, with the locking mechanism in a released position.

Referring now to FIGS. 5 and 14, the latch assembly 100 includes an optional manual release assembly 200 that releases the latch assembly when power is not available to power the actuator 186 of the powered release assembly 180.

The manual release assembly 200 includes a lever 202 rotatably coupled to the frame 30 about an axis 220. A handle 204 is rotatably coupled to one end of the lever 202 about an axis 222 and includes an aperture 206 to give the handle a ring-like shape. As shown in FIG. 5, when the manual release assembly 200 is disengaged, the lever 202 and the handle 204 are generally flush with the upper surface of the frame 30.

An elongate fitting 208 is rotatably coupled at one end to the lever 202 about an axis 224. The opposite end of the elongate fitting 208 is supported by a pin 212 slidably disposed within a slot 210 formed in the elongate fitting. The pin 212 is fixedly located relative to the frame 30 about an axis 226. With the elongate fitting 208 supported by the pin 212 in this manner, rotation of the lever 202 about axis 220 drives the elongate fitting 208 toward the bar 184 of the powered release assembly 180. A spring 214 is attached at one end to the lever 202 and at the other end to the fitting 208 to bias the manual release assembly 200 toward the disengaged position of FIG. 5.

To release the locking mechanism 110 using the manual release assembly 200, an operator rotates the handle 204 upward about axis 222 and the pulls on the handle to rotate the lever 202 about axis 220. Rotation of the lever 202 drives the elongate fitting 208 into a portion of the bar 184, thereby engaging the bar with the catch 150 to move the locking mechanism 110 into a release position. With the latch assembly 100 released, the ramp portion 60 can be moved toward the deployed position. When the operator releases the handle 200, the spring 214 biases the manual release assembly 200 to its disengaged state.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A latch assembly for a ramp assembly, the ramp assembly comprising a ramp portion selectively movable between a stowed position and a deployed position, the latch assembly comprising:
    (a) a latch fitting rotatably mounted to the ramp assembly;
    (b) a catch rotatably mounted to the ramp assembly, the catch engaging the latch fitting to selectively lock the latch fitting in a first locked position and a second locked position; and
    (c) a pin coupled to the latch fitting, rotation of the latch fitting moving the pin in an arcuate path, the pin engaging the ramp portion when the latch fitting is in the first locked position and in the second locked position.

2. The latch assembly of claim 1, the latch fitting comprising a first cam surface, the first cam surface engaging the catch when the latch fitting is in the first and second locked positions.

3. The latch assembly of claim 2, the catch comprising a second cam surface, the second cam surface engaging the first cam surface when the latch fitting is in the first and second locked positions.

4. The latch assembly of claim 3, contact between the first and second cam surfaces defining a contact point, the contact point and an axis of rotation of the latch fitting defining a line of force, the line of force having a constant angle relative to the second cam surface at the contact point when the latch fitting is in the first and second locked positions.

5. The latch assembly of claim 4, wherein the first cam surface maintains sliding contact with the second cam surface as the latch fitting moves from the first locked position to the second locked position.

6. The latch assembly of claim 5, wherein the line of force maintains a constant angle relative to the second cam surface at the contact point as the latch fitting moves from the first locked position to the second locked position.

7. The latch assembly of claim 1, further comprising a biasing element, the biasing element biasing the latch fitting to rotate in a first direction.

8. The latch assembly of claim 7, the biasing element biasing the catch to rotate in a second direction opposite the first direction.

9. The latch assembly of claim 1, wherein the pin slidingly engages a slot formed in the ramp portion when the ramp portion moves from the deployed position to the stowed position.

10. The latch assembly of claim 1, wherein movement of the ramp portion from the deployed position toward the stowed position drives the latch fitting from an unlocked position to the first locked position.

11. The latch assembly of claim 10, wherein movement of the ramp portion from the deployed position toward the stowed position drives the latch fitting from the first locked position to the second locked position.

* * * * *